US00RE41373E

(19) United States
(12) Reissued Patent
Gehman

(10) Patent Number: US RE41,373 E
(45) Date of Reissued Patent: Jun. 15, 2010

(54) ROTARY ENGINE

(76) Inventor: Grant G. Gehman, 314 S. Water St., Knoxville, PA (US) 16928-9702

(21) Appl. No.: 11/807,954

(22) Filed: May 30, 2007

Related U.S. Patent Documents

Reissue of:
(64) Patent No.: 6,935,300
Issued: Aug. 30, 2005
Appl. No.: 10/660,082
Filed: Sep. 11, 2003

U.S. Applications:
(63) Continuation-in-part of application No. 10/441,807, filed on May 19, 2003, now abandoned.

(51) Int. Cl.
*F02B 53/04* (2006.01)
*F02B 53/00* (2006.01)
*F01C 1/24* (2006.01)

(52) U.S. Cl. ..... 123/232; 123/249; 418/196

(58) Field of Classification Search ..... 123/232, 123/231, 222, 238, 204, 209, 246, 249, 225; 418/196, 191
See application file for complete search history.

(56) References Cited

U.S. PATENT DOCUMENTS

| | | | | | |
|---|---|---|---|---|---|
| 858,912 | A | * | 7/1907 | Rousseau | 123/246 |
| 976,691 | A | * | 11/1910 | Prall | 123/232 |
| 1,228,806 | A | * | 6/1917 | Morris | 123/231 |
| 1,294,771 | A | | 2/1919 | Conklin | 123/232 |
| 1,845,834 | A | | 2/1932 | Faulman | 123/249 |
| 2,152,564 | A | * | 3/1939 | Perkins | 418/196 |
| 2,215,096 | A | | 9/1940 | Fanberg | 123/238 |
| 2,571,642 | A | * | 10/1951 | Yancy | 123/232 |
| 2,920,610 | A | * | 1/1960 | Breelle | 123/246 |
| 2,920,814 | A | * | 1/1960 | Breelle | 123/232 |
| 2,927,560 | A | * | 3/1960 | Breelle | 123/232 |
| 2,977,939 | A | * | 4/1961 | Fearing | 418/196 |
| 3,401,676 | A | * | 9/1968 | Wanzenberg | 123/232 |
| 3,780,710 | A | | 12/1973 | Przybylski | 123/8.47 |
| 3,935,840 | A | | 2/1976 | Fisher | 123/8.23 |
| 3,941,527 | A | | 3/1976 | Allington | 418/196 |
| 3,965,697 | A | | 6/1976 | Beierwaltes | 418/196 |
| 3,990,409 | A | * | 11/1976 | Beverly | 418/196 |
| 4,848,295 | A | | 7/1989 | Loran | 123/222 |
| 6,003,486 | A | | 12/1999 | Vanmoor | 123/249 |
| 6,125,814 | A | | 10/2000 | Tang | 123/222 |
| 6,132,197 | A | | 10/2000 | Adamovski et al. | 418/191 |
| 6,142,758 | A | | 11/2000 | Taggett | 418/196 |
| 6,250,277 | B1 | | 6/2001 | Adamovski et al. | 123/238 |
| 6,488,004 | B1 | | 12/2002 | Adamovski et al. | 123/232 |

FOREIGN PATENT DOCUMENTS

| | | | | |
|---|---|---|---|---|
| DE | 3140749 A1 | * | 4/1983 | |
| WO | WO9102888 A1 | | 3/1991 | 123/232 |

* cited by examiner

*Primary Examiner*—Thai Ba Trieu
(74) *Attorney, Agent, or Firm*—Kevin M. Able

(57) ABSTRACT

A rotary engine having a housing and a first and second intersecting cavity disposed therein. The rotary engine includes a rotor rotatably mounted in the first cavity, the rotor and the housing defining an annular chamber therebetween, and a piston extending radially from the rotor into the annular chamber. The rotary engine further includes a valve having a combustion chamber rotatably mounted in the second cavity, and a passage formed along a circumference of an inner wall of the second cavity for delivering combustion gases from the combustion chamber to the annular chamber.

9 Claims, 8 Drawing Sheets

ROTARY ENGINE

Matter enclosed in heavy brackets [ ] appears in the original patent but forms no part of this reissue specification; matter printed in italics indicates the additions made by reissue.

This is a continuation-in-part of U.S. patent application Ser. No. 10/441,807 filed on May 19, 2003 now abandoned, the content of which is relied upon and incorporated herein by reference in its entirety, and the benefit of priority under 35 U.S.C. § 120 is hereby claimed.

BACKGROUND OF THE INVENTION

1. Field of the Invention

The invention relates to an internal combustion engine, and more specifically to a rotary internal combustion engine.

2. Technical Background

The internal combustion engine has been at the center of industrial evolution for the last century. One of the most dramatic aspects of this evolution has been the automobile, which has helped to shape and transform a culture. Yet for all the dramatic technological progress over the last 100 years, the internal combustion engine, and particularly the reciprocating internal combustion engine, has not substantially changed during that period. Although significant improvements have been made in the design and construction of internal combustion engines, the reciprocating piston internal combustion engine that dominates the automotive industry remains notoriously energy inefficient, commanding only about a 24% overall efficiency.

Rotary engines overcome some of the problems inherent in reciprocating internal combustion engines. The Wankel rotary engine is the most well-known of the rotary engines, having enjoyed a small amount of commercial success in certain automobiles. The engine has approximately 48% fewer moving parts than an equivalent reciprocating piston engine, with about one third the size and weight. One advantage of the Wankel rotary engine over reciprocating piston internal combustion engines is a higher RPM than reciprocating piston engines since the reciprocating motion of the pistons is eliminated. However, the Wankel engine also tends to have low torque at high speeds, thereby resulting in increased fuel consumption.

Prior art rotary engines have attempted to address many of the shortcomings of both the reciprocating piston internal combustion engine and the Wankel rotary engine. Prior art rotary engines have, for example, used a rotating valve which compression region of the engine and the rotating combustion chamber as the piston advances toward the valve in order to minimizes sharp pressure changes in the engine. However, such prior art rotary engines fail to provide for a continuous discharge of the expanding combustion gases from the combustion chamber as the valve and combustion chamber rotate. Other prior art rotary engines disclose rotating valves having internal combustion chambers, and include passages for equalizing pressure between the annular region surrounding the main rotor and the combustion chamber. However, the passage within these rotary engines are narrowly constructed, and provide a limited opportunity to deliver combustion gases to the annular region.

SUMMARY

It is to be understood that both the foregoing general description and the following detailed description present embodiments of the invention, and are intended to provide an overview, or framework, for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

In one aspect of the invention, the rotary engine includes a housing having a first and second intersecting cavity disposed therein. Each of the first and second cavities have cylindrical wall surfaces. A rotor is rotatably mounted in the first cavity, and the housing and the rotor define an annular chamber disposed therebetween. The rotor includes a piston extending from the rotor into the annular chamber. A first valve, rotatably mounted in the second cavity, has a circumference and includes a recess sized to receive the piston during a rotation of the rotor. The rotary engine also includes at least one passage including an open portion formed in the cylindrical wall surface of the second cavity and an enclosed portion enclosed by the housing along a length of the enclosed portion, the open portion including a leading end and a trailing end with respect to a direction of rotation of the first valve and which open portion extends for at least about 20 degrees around a circumference of the cylindrical wall surface of the second cavity, and wherein the enclosed portion connects the open portion to the annular chamber downstream of the second cavity relative to a direction of rotation of the rotor.

The passage, the open portion of which extends around a portion of the circumference of the valve cavity and the enclosed portion which further connects the open portion with the annular cavity, advantageously collects expanding combustion gases from the valve recess (in which combustion was initiated) and carries the expanding combustion gases from the valve recess to the annular chamber behind the passing piston through a portion of the rotation of the valve, thus providing for efficient fuel utilization and reduced emission of undesirable waste products through more complete combustion of the fuel.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview, or framework, for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
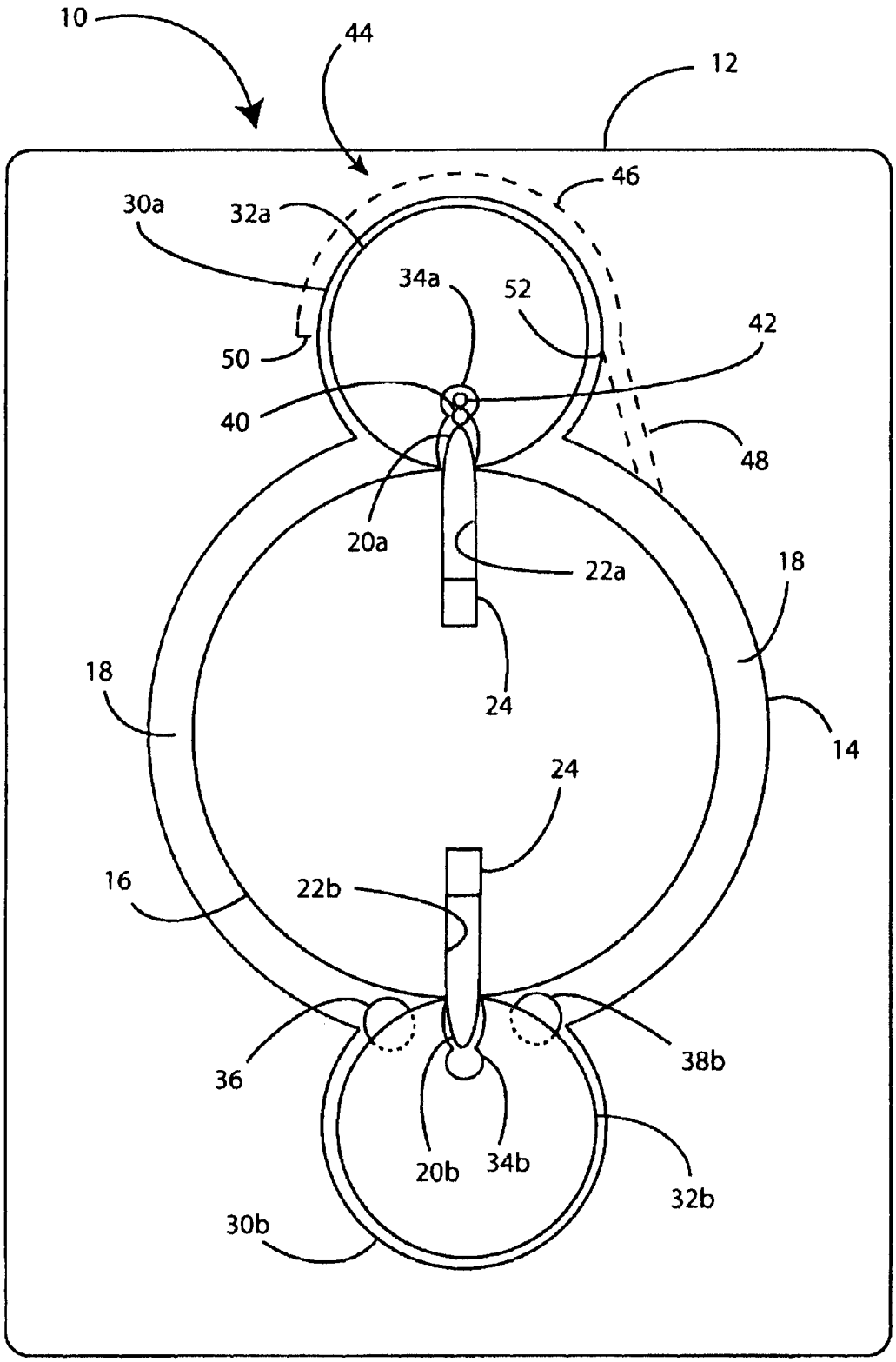
FIG. 1 is a view of a first embodiment of the rotary engine according to the present invention.

In the following, preferred embodiments of the rotary engine in accordance with the present invention will be explained in detail with reference to the drawings. In the explanation of the drawings, constituents identical to each other will be referred to with numerals or letters identical to each other, without repeating their overlapping descriptions. Also, ratios of sizes in the drawings do not always coincide with those explained.

In a first embodiment of the invention, shown in FIG. 1, rotary engine 10 includes a housing 12 defining a main cylindrical cavity 14. A rotor 16, rigidly and coaxially attached to a drive shaft (not shown), is rotatably and coaxially mounted within main cavity 14. The rotor 16 and the housing 12 define an annular chamber 18 disposed therebetween. Main cavity 14 will hereinafter be referred to as rotor cavity 14.

Figure 2:
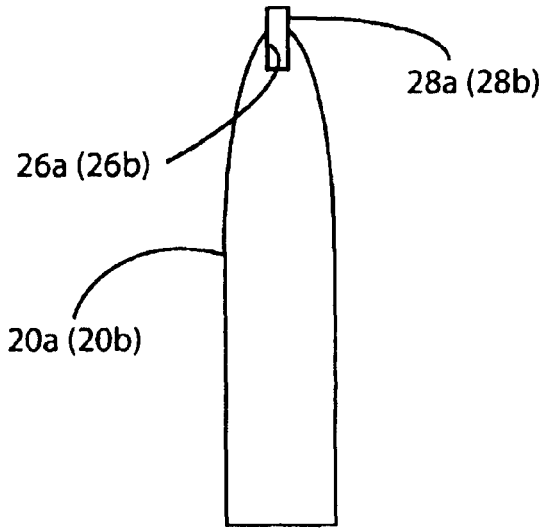
FIG. 2 is a detail view of a piston fitted with a compression seal.

Rotor 16 includes two pistons 20a and 20b extending from rotor 16 into annular chamber 18. Pistons 20a and 20b may be rigidly attached to the periphery of rotor 16, for example by suitable fasteners, such as bolts, or by welding, or pistons 20a and 20b and rotor 16 may be formed from a homogeneous material by casting or milling, for example. Preferably, rotor 16 includes slots 22a and 22b in which pistons 20a and 20b are disposed. Preferably, pistons 20a and 20b are rigidly mounted in slots 22a and 22b, more preferably pistons 20a and 20b are slidably disposed in slots 22a and 22b, respectively. Preferably, slots 22a and 22b each include an extension element 24, wherein the extension of pistons 20a and 20b into annular chamber 18 may be varied by extension element 24 to adjust the clearance between pistons 20a and 20b and the wall surface of rotor cavity 14 (which is also the outer wall surface of annular chamber 18). Extension element 24 may be, for example, a jack screw. Preferably, pistons 20a and 20b are in sliding contact with the wall surface of rotor cavity 14. As depicted in FIG. 2, pistons 20a and 20b preferably include slots 26a and 26b, located at the apex of pistons 20a and 20b, in which compression seals 28a and 28b are disposed. FIG. 2 illustrates piston 20a with slot 26a and seal 28a. The reference numbers in parenthesis represent a similar configuration for piston 20b.

Referring again to FIG. 1, housing 12 further defines two cylindrical cavities 30a and 30b disposed adjacent to, and intersecting with, rotor cavity 14. Cylindrical valves 32a and 32b are rotatably and coaxially mounted within the two cavities 30a and 30b, respectively. It should be noted that for the purposes of illustration only, an appreciable gap is seen in FIG. 1 between the wall surfaces of cavities 30a and 30b, and the outside cylindrical surface of their respective valves 32a and 32b. Preferably, the fit between the walls of cavities 30a and 30b, and the outside cylindrical surface of their respective valves 32a and 32b is sufficiently close to minimize leakage of gases around the valves and into annular chamber 18.

Cylindrical valves 32a and 32b are positioned relative to rotor 16 such that the outside cylindrical surfaces of valves 32a and 32b are in close proximity to the corresponding outside cylindrical surface of rotor 16 in order to minimize any leakage of gases between the valves 32a and 32b and rotor 16. Without such close proximity, the leakage of gases between valves 32a and 32b and rotor 16 would result in a reduction in power output from the engine.

Each valve 32a and 32b includes a recess 34a and 34b formed in the outside cylindrical surface of the valves, respectively, each of the recesses 34a and 34b being sized to receive pistons 20a and 20b during a rotation of rotor 16. That is, as each piston moves past a valve, the piston is inserted into the valve recess, thus allowing the piston to traverse the valve. For the purpose of further discussion, valve 32a defines a combustion valve and valve 32b defines an intake/exhaust valve. Cavities 30a and 30b will hereinafter be referred to as combustion valve cavity 30a and intake/exhaust valve cavity 30b.

Rotor 16, combustion valve 32a and intake/exhaust valve 32b are connected through conventional mechanical linkages (not shown), such as shafts and gears, so that valves 32a and 32b rotate in a direction opposite that of rotor 16, and are synchronized therewith such that, as each piston traverses a valve, the piston is received into a recess. Rotor 16 is hereinafter assumed to rotate in a clockwise direction, while valves 32a and 32b are assumed to rotate in a counterclockwise direction. However, rotary engine 10 could easily be designed wherein rotor 16 rotates in a counterclockwise direction and valves 32a and 32b rotate in a clockwise direction. Valves 32a and 32b also each preferably have a diameter one half the diameter of rotor 16, and preferably rotate two full cycles (720 degrees) for every one full cycle of rotation (360 degrees) of rotor 16.

Housing 12 further includes an air intake port 36 for the intake of air into annular chamber 18, and an exhaust port 38 for the discharge of combustion gases from annular chamber 18. Intake port 36 and exhaust port 38 are positioned near intake/exhaust valve 32b. Preferably, intake port 36 and exhaust port 38 are partially overlapped by intake/exhaust valve 32b during at least a portion of the rotation of intake/exhaust valve 32b. During at least a portion of the rotation of intake/exhaust valve 32b, recess 34b is preferably positioned so as to provide an increased flow of combustion gases discharged through exhaust port 38, and air brought in through intake port 36. Thus intake/exhaust valve 32b varies the flow of intake air and combustion gases into and out of annular chamber 18, respectively.

The positioning of intake port 36 and exhaust port 38 near intake/exhaust valve 32b maximizes the working distance of each piston undergoing a combustion event. Maximizing the distance a piston travels from the time ignition of the fuel occurs to the time the piston passes exhaust port 38, maximizes the time during which the expanding combustion gases are acting upon the rearward surface of the piston to drive the piston forward, while the forward surface of the piston simultaneously forces the combustion gases from the previous combustion event from annular chamber 18 through exhaust port 38. Similarly, the intake of fresh air through intake port 36 is maximized by extending the distance between intake port 36 and the point at which valve 20a and rotor 16 are at their closest proximity. Thus, more energy may be extracted from the expanding combustion gases, and ventilation of the engine is optimized.

Housing 12 also includes at least one fuel injection port 40 located in housing 12 and connecting with combustion valve cavity 30a such that an end face of combustion valve 32a completely covers fuel injection port 40 during at least a portion of the rotation of combustion valve 32a. During another portion of the rotation of combustion valve 32a fuel injection port 40 is uncovered by recess 34a, allowing fuel to be injected directly into recess 34a. Fuel may be injected, for example, by a conventional automotive fuel injector. In addition to fuel injection port 40, at least one ignition port 42 is also located in housing 12 and connecting with combustion valve cavity 30a such that an end face of combustion valve 32a completely covers ignition port 42 during at least a portion of the rotation of combustion valve 32a. That is, both fuel injection port 40 and ignition port 42 are located adjacent to an end face of combustion valve 32a. Preferably, both fuel injection port 40 and ignition port 42 are both uncovered during the same portion of the rotation of combustion valve 32a. Ignition port 42 may be fitted with a conventional ignition device, such as, for example, a spark plug or, depending upon the compression ratio in the combustion chamber, a glow plug. In some instances, for example when compression ratios exceed about 20:1, ignition may occur spontaneously during injection of the fuel as a result of heat generated during the compression of air by the pistons, in which case an ignition device may not be necessary.

It should be noted that, although FIG. 1 indicates fuel injection port 40 and ignition port 42 located on a single side of housing 12, multiple fuel injection ports and ignition ports may advantageously be employed. For example, a fuel injection port may be located on either side of housing 12, both fuel injection ports connecting to combustion valve cavity 30a at opposing locations so that fuel may be injected into recess 34a simultaneously from both ends of recess 34a. That is, a fuel injection port 40 may be connected with combustion valve cavity 30a adjacent one end of combustion valve 32a, relative to the axis of rotation of combustion valve 32a, while another fuel injection port 42 may be connected with combustion valve cavity 30a adjacent the opposing end of combustion valve 32a. Preferably, the opposing fuel injection ports are positioned at about the same radial position so that fuel may be injected into recess 34a from both ports at the same time. An ignition port 42 may be similarly positioned on either side of housing 12 and connecting with combustion valve cavity 30a at generally opposing locations so that the ignition devices can be simultaneously utilized to ignite the fuel from opposite ends of recess 34a.

Figure 3:
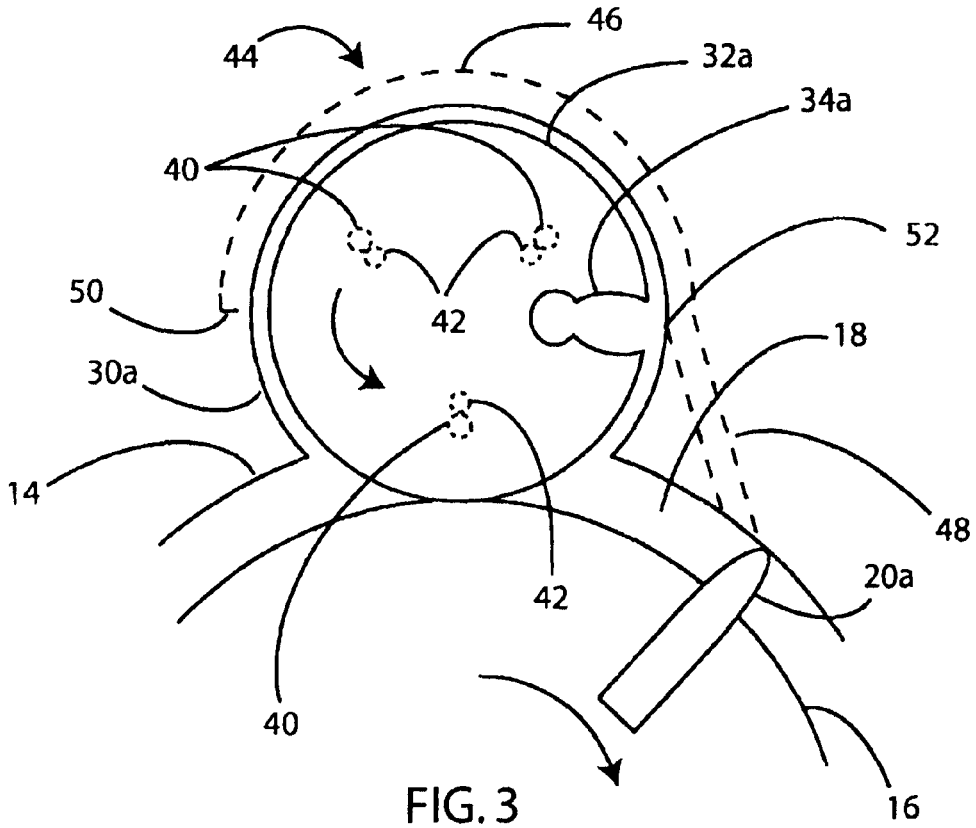
FIG. 3 is a detail view of a combustion valve and combustion valve cavity showing multiple fuel and ignition ports.

In addition, where a plurality of fuel injection ports 40 are used, fuel injection ports 40 may be spaced at predetermined points about the axis of rotation of combustion valve 32a and "below" combustion valve 32a (that is, such that each fuel injection port is covered by an end face of combustion valve 32a during at least a portion of the rotation of combustion valve 32a) so that, as combustion valve 32a, and recess 34a, rotate, additional fuel may be injected into recess 34a as recess 34a uncovers each successive fuel injection port and additional fuel is injected into recess 34a to prolong the combustion process and provide additional combustion gases. FIG. 3 is a detail view of combustion valve 32a and combustion valve cavity 30a showing multiple fuel injection ports 40 located at an end of combustion valve 32a. The dashed lines indicating combustion ports 40 show that the plurality of fuel injection ports are covered by an end face of combustion valve 32a in the rotary position indicated. A plurality of ignition devices may also be used to sustain the combustion process, represented by the additional ignition ports 42 shown in FIG. 3.

Figure 4:
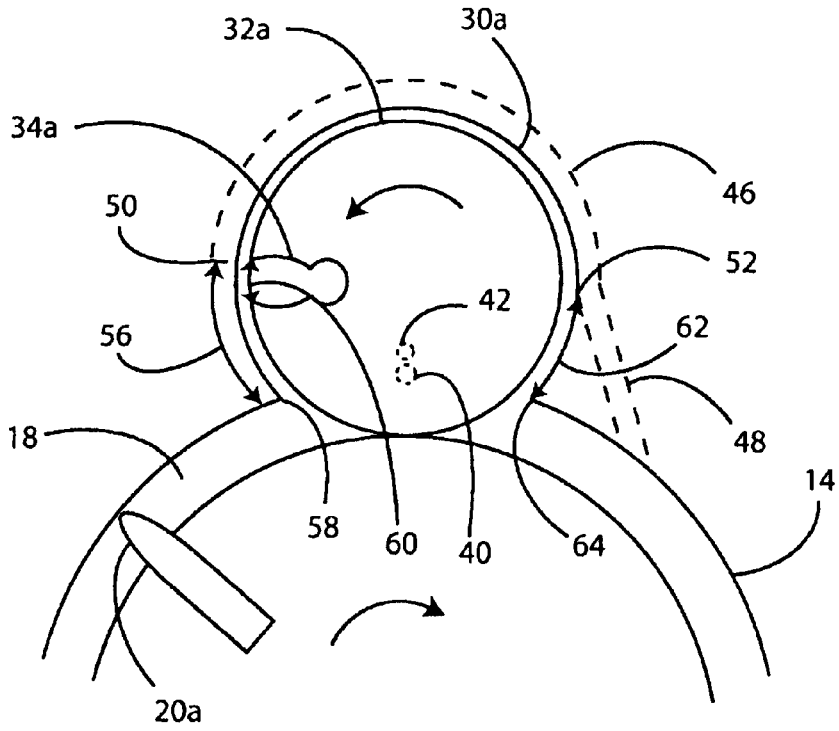
FIG. 4 is a detail view of a combustion valve and combustion valve cavity showing the relative locations of the leading and trailing ends of a passage in the wall surface of the combustion valve cavity.

Again referring to FIG. 1, at least one passage 44 extends along a portion of the circumference of the wall surface of combustion valve cavity 30a, through the interior of housing 12, and opens into annular cavity 18 through the wall surface of rotor cavity 14. The passage 44 includes an open portion 46 and an enclosed portion 48. The open portion 46 of passage 44 is positioned around a portion of the circumference of the wall surface of combustion valve cavity 30a and is open to combustion valve cavity 30a along the length of open portion 46. Open portion 46 of passage 44 includes a trailing end 50 and a leading end 52 relative to the direction of rotation of combustion valve 32a. Preferably, the open portion 46 of passage 44 extends at least about 20 degrees around the circumference of combustion valve cavity 30a, more preferably for at least about 45 degrees, still more preferably for about at least 90 degrees, and most preferably for at least about 180 degrees. As shown in FIG. 4, open portion 46 of passage 44 terminates at trailing end 50 a distance 56 from the intersection 58 between combustion valve cavity 30a and rotor cavity 14 on the downstream side of combustion valve cavity 30a, relative to the direction of rotation of combustion valve 32a. Preferably, distance 56 is greater than the distance 60 across the entrance, or mouth, of recess 34a to prevent recess 34a from serving as a pressure short circuit between the region of annular chamber 18 on one side of combustion valve 32a and the region of annular chamber 18 on the opposite side of the combustion valve 32a. Leading end 52 of the open portion 46 of passage 44 is preferably located a distance 62 from intersection 64 of rotor cavity 14 and combustion valve cavity 30a. Preferably, distance 62 is greater than distance 60, i.e. greater than the width of the mouth of recess 34a, the prevent combustion gases from being carried to annular chamber 28 prematurely, ahead of advancing piston 20a.

Still referring to FIG. 4, enclosed portion 48 of passage 44 extends from leading end 52 of open portion 46 through the interior of housing 12, and opens into annular chamber 18 through the cylindrical wall surface of rotor cavity 14 downstream of combustion valve cavity 30a relative to the direction of rotation of rotor 16. Enclosed portion 48 of passage 52 is enclosed by housing 12 along the length of enclosed portion 48.

Figure 5:
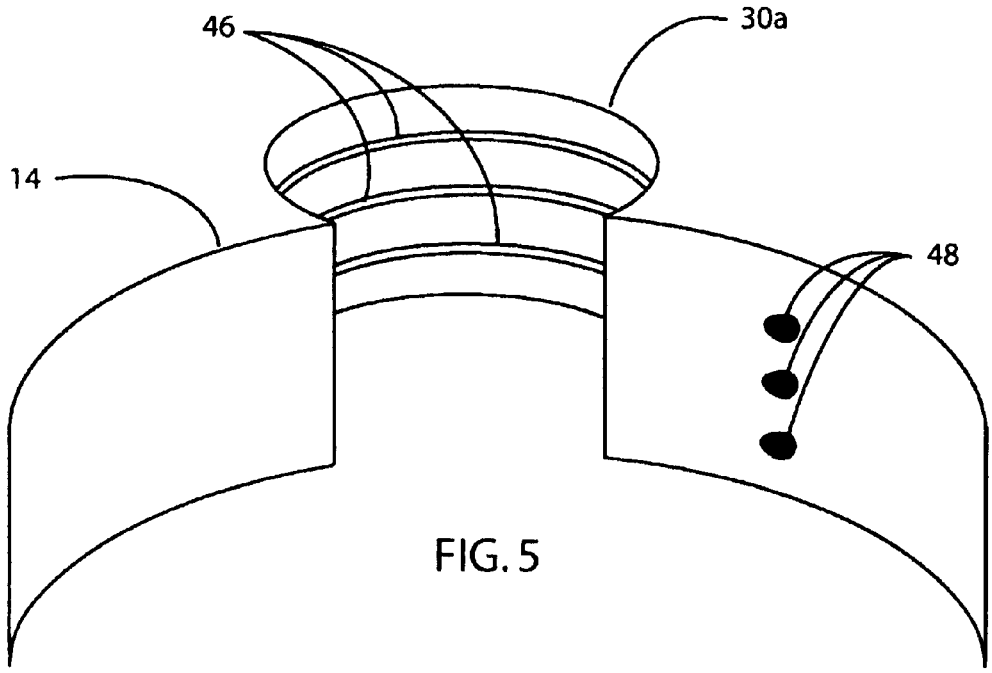
FIG. 5 is a perspective view of a combustion valve cavity showing the location and arrangement of multiple passages.
Figure 6:
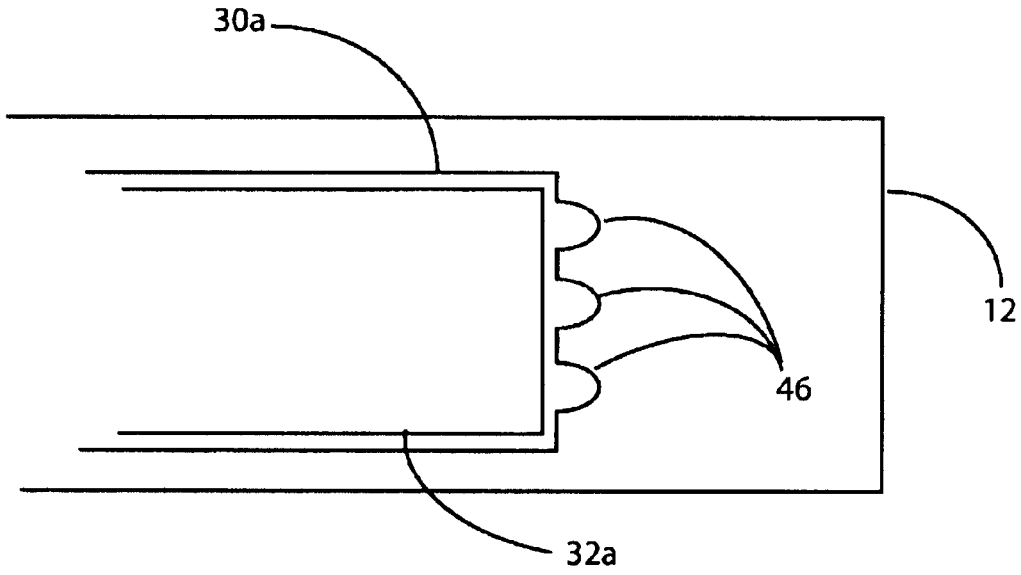
FIG. 6 is a detail view of a combustion valve cavity and combustion valve showing the arrangement of multiple passages.
Figure 7:
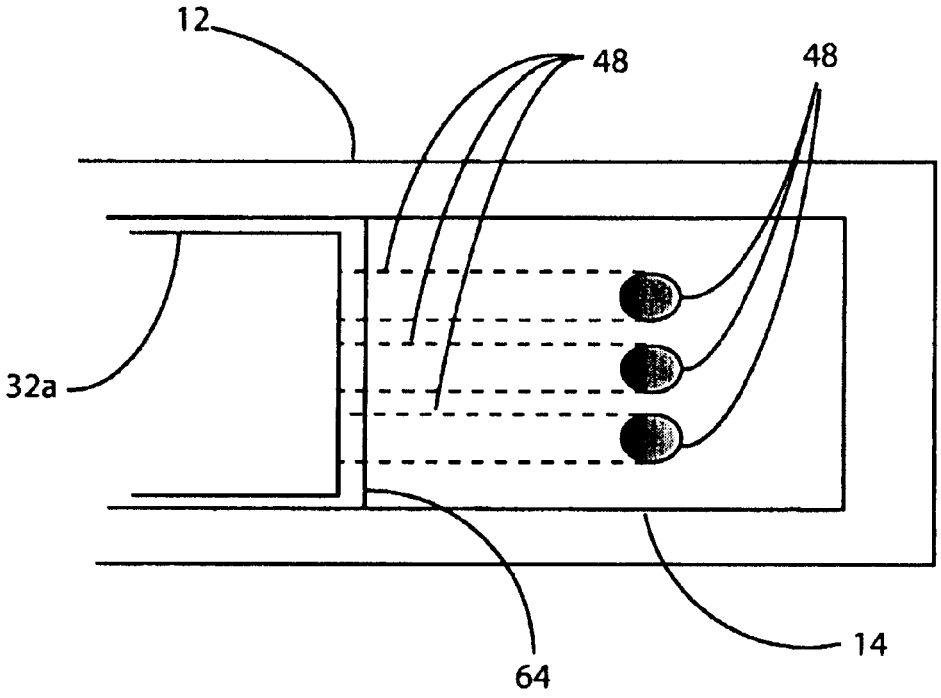
FIG. 7 is a detail view of the inside surface of the rotor cavity showing the relative location where the passages open into the annular chamber.

Preferably, a plurality of passages 44 are disposed around at least a portion of the circumference of combustion valve cavity 30a. FIGS. 5–7 show three additional views of multiple passages 44. For illustration purposes, a total of three passages are shown in FIGS. 5–7. However, the number of passages is dependent upon, inter alia, the length of combustion valve 32a, i.e. the distance in a direction parallel to the axis of rotation of valve 32a. The longer the length of valve 32a, the more passages that are needed for carrying combustion gases from recess 34a in rotating combustion valve 32a to annular chamber 18. FIG. 5 is a detail view of the wall surface of combustion valve cavity 30a and a portion of the wall surface of rotor cavity 14. Visible in FIG. 5 are the open portions 46 of passages 44 located along the wall of combustion valve cavity 30a, and a view of the locations on the wall surface of rotor cavity 14 where the enclosed portions 48 of passages 44 open into annular chamber 18. FIG. 6 is a second view of combustion valve cavity 30a showing combustion valve 32a and the open portions 46 of passages 44 along a portion of the wall surface of combustion valve cavity 30a. It should be noted that, although the passages illustrated in FIG. 6 have a generally rounded shape, the passages may have other geometric shapes as may be needed for engine performance or machineability, such as, for example, rectangular. FIG. 7 is a detail view of the wall of rotor cavity 14 showing the location where the enclosed portions 48 of passages 44 open into annular chamber 18. The dashed lines in FIG. 7 indicate where the enclosed portions 48 of passages 44 extend through the interior of housing 12, from the wall surface of annular chamber 18 toward combustion valve cavity 30a.

Figure 8:
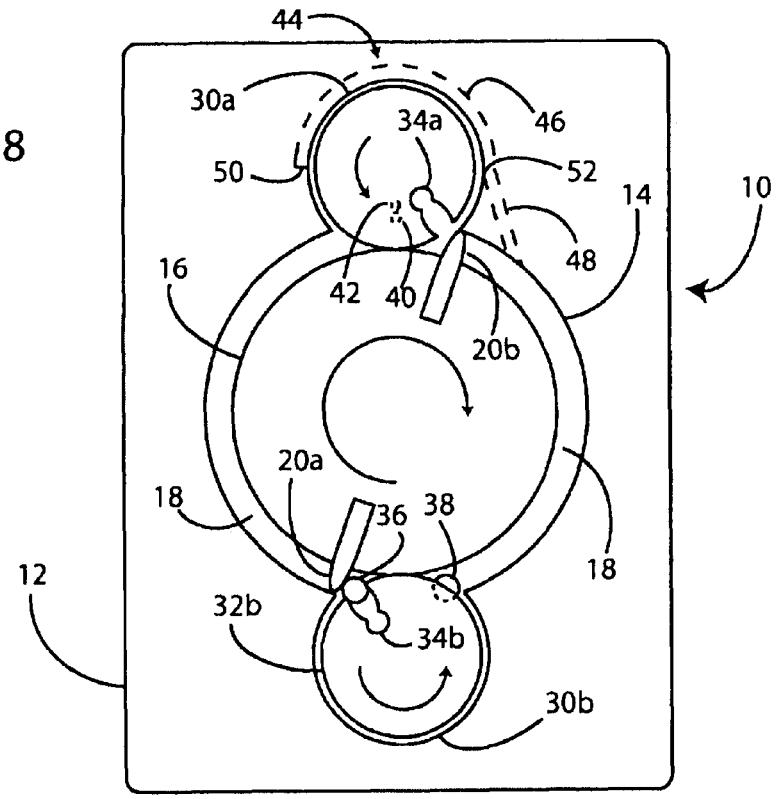
FIG. 8 is a view of the rotary engine of FIG. 1 as a first piston begins compressing air at a front surface and drawing in fresh air behind it.
Figure 9:
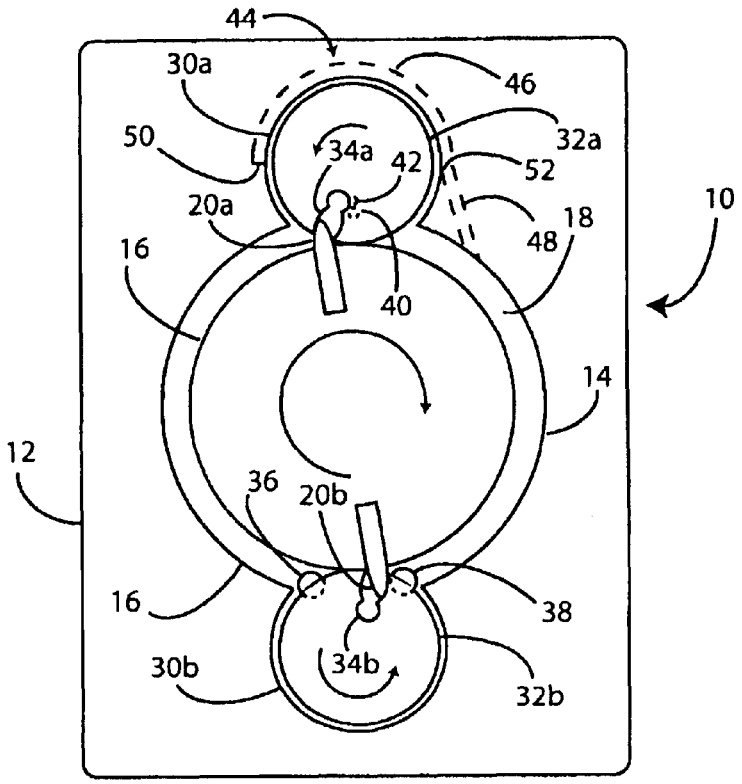
FIG. 9 is a view of the rotary engine of FIG. 1 showing the pistons being received into the valve recesses.
Figure 11:
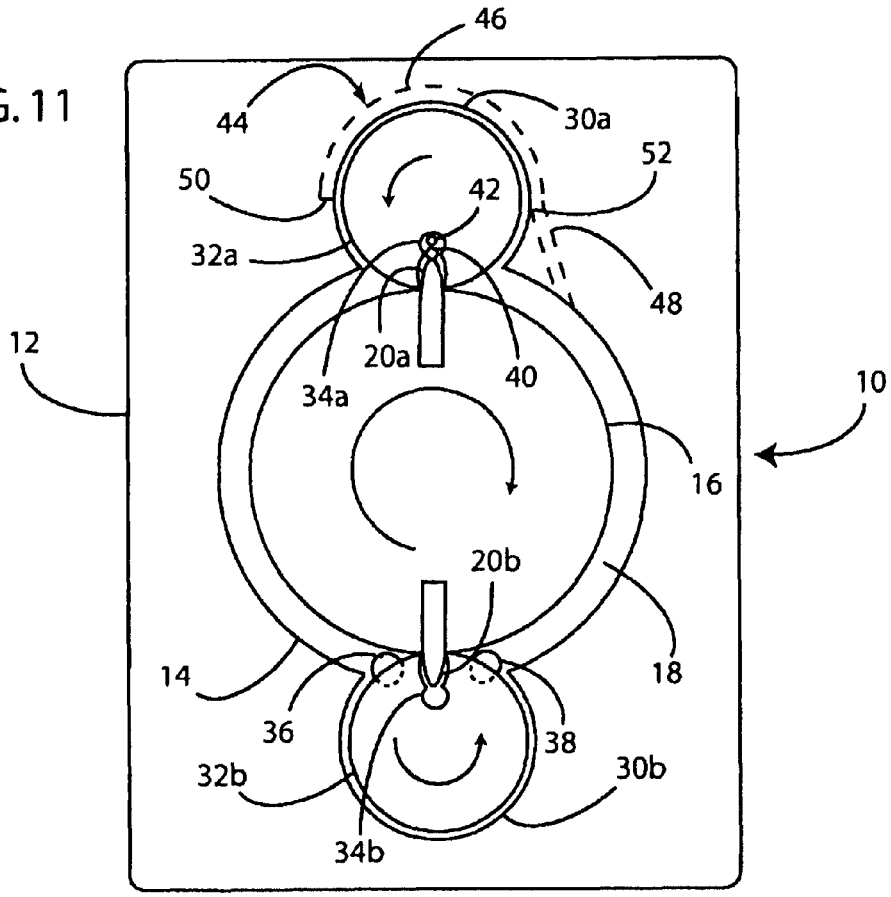
FIG. 11 is a view of the rotary engine of FIG. 1 showing the valves and pistons at top dead center position.

The following describes the operation of rotary engine 10. FIGS. 8, 9 and 11 show rotor 16 in three different rotary positions. As rotor 16 rotates in a clockwise direction through annular chamber 18, valves 32a and 32b are simultaneously rotating in a counterclockwise direction at a radial velocity such that the surface speed at the outside cylindrical surface of valves 32a and 32b are the same as the surface speed at the outside cylindrical surface of rotor 16. Valves 32a and 32b preferably complete two full (360 degree) rotations for each complete rotation of rotor 16. Valves 32a and 32b are preferably one half the diameter of rotor 16. Optionally, valves 32a and 32b may also be formed with multiple recesses, wherein the diameter of valves 32a and 32b may be adjusted accordingly. For example, in the case where valves 32a and 32b have two recesses each, valves 32a and 32b preferably have the same diameter as rotor 16 and valves 32a and 32b preferably complete one full revolution for each full revolution of rotor 16.

Figure 10:
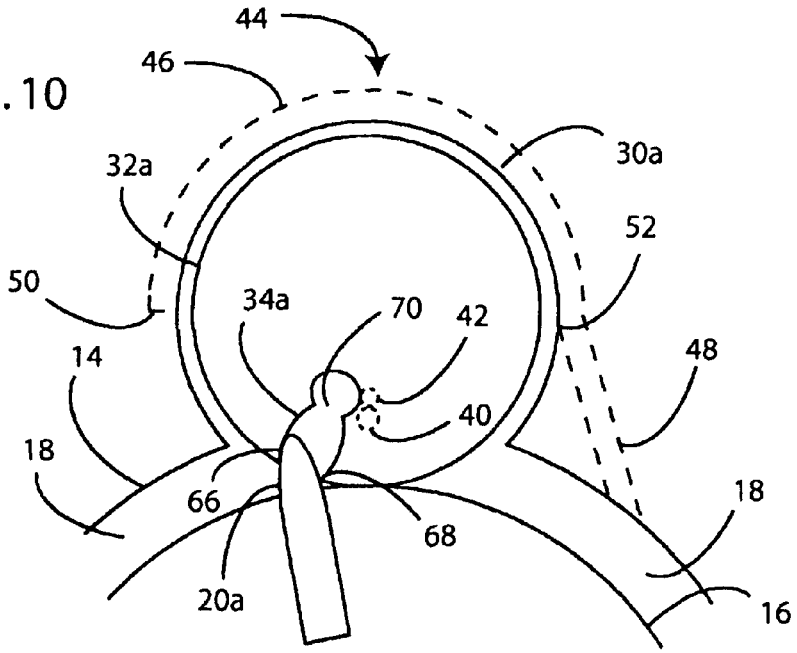
FIG. 10 is a detail view of a combustion valve showing a piston being received by a valve recess.

As shown in FIG. 8 as piston 20a leaves intake/exhaust valve 32b, intake/exhaust valve 32b is rotating into a position in which recess 34b passes over intake port 36, allowing an increased flow of air into annular chamber 18 behind piston 20a through intake port 36. At the same time, piston 20a is compressing air ahead of the forward face of piston 20a which was previously drawn into annular chamber 18 through intake port 36 by piston 20b. Turning to FIG. 9, as piston 20a approaches combustion valve 32a, combustion valve 32a is rotating into a position such that piston 20a is received into recess 34a, therefore allowing piston 20a to traverse valve 32a. FIG. 10 shows a detail view of piston 20a being received into recess 34a. Recess 34a is sized to ensure that there is sliding contact between piston 20a and recess 34a at a minimum of two points 66 and 68 on piston 20a while piston 20a is cooperating with recess 34a. Points 66 and 68 are located on opposing sides of piston 20a, thus sealing recess 34a from annular chamber 18. The exact location of points 66 and 68 may vary as rotor 16 and combustion valve 32a rotate. The excess space between the portion of piston 20a received into recess 34a and combustion valve 32a encompassing and defining recess 34a forms a closed combustion chamber 70 within recess 34a during the time that piston 20a is cooperating with valve 32a. The size and shape of recess 34a, and therefore combustion chamber 70, may be varied depending upon such design-dependent variables as fuel choice, compression ratio, piston size, engine power output, and so forth.

Referring now to FIG. 11, as piston 20a traverses valve 32a it approaches a top dead center position. Top dead center is defined as the position wherein pistons 20a and 32b, and recesses 34a and 34b lie symmetrically on a line extending from the axis of rotation of combustion valve 32a to the axis of rotation of intake/exhaust valve 32b. At a position of top dead center, piston 20a (or piston 20b) is at a point of maximum insertion into recess 34a (or recess 34b). The relative position of pistons and valves at top dead center is illustrated in FIG. 11. As combustion valve 32a approaches the top dead center position, fuel injection port 40 is uncovered by recess 34a and fuel is injected into combustion chamber 70 formed between piston 20a and valve 32a in recess 34a.

During a period of time in which ignition port 42 is uncovered and piston 20a is received into recess 34a, the ignition device in ignition port 42 ignites the fuel in combustion chamber 70. Thus ignition is initiated entirely within the confines of combustion chamber 70 in recess 34a, i.e. within the circumference of combustion valve 32a. The timing of the fuel ignition, that is, for example, the firing of a spark plug, is dependent upon a variety of factors, including engine load, altitude, engine speed, etc., and is controlled by conventional methods. For example, a distributor may be used to time the ignition. Alternatively, ignition may be timed by a computing device which uses data from a variety of sensors to optimize ignition. Sensed parameters may include engine speed, air temperature, exhaust gas oxygen content, and other parameters as may be required to optimize ignition.

Figure 12:
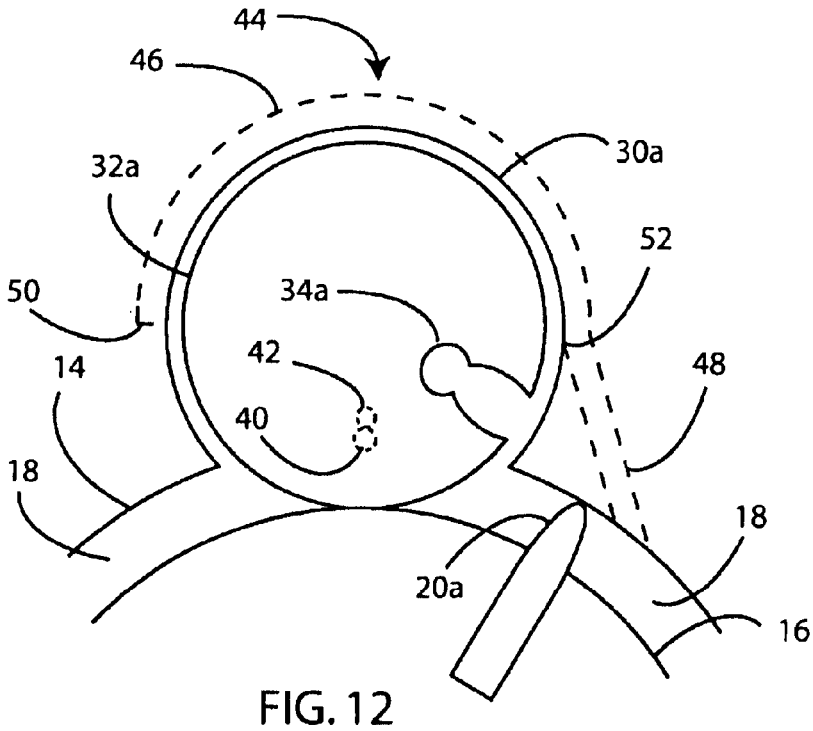
FIG. 12 is a detail view of a combustion valve showing the relative positions between a piston, a rotating combustion valve and a passage as before combustion gases begin to be carried from the combustion valve to the annular chamber by the passage.
Figure 13:
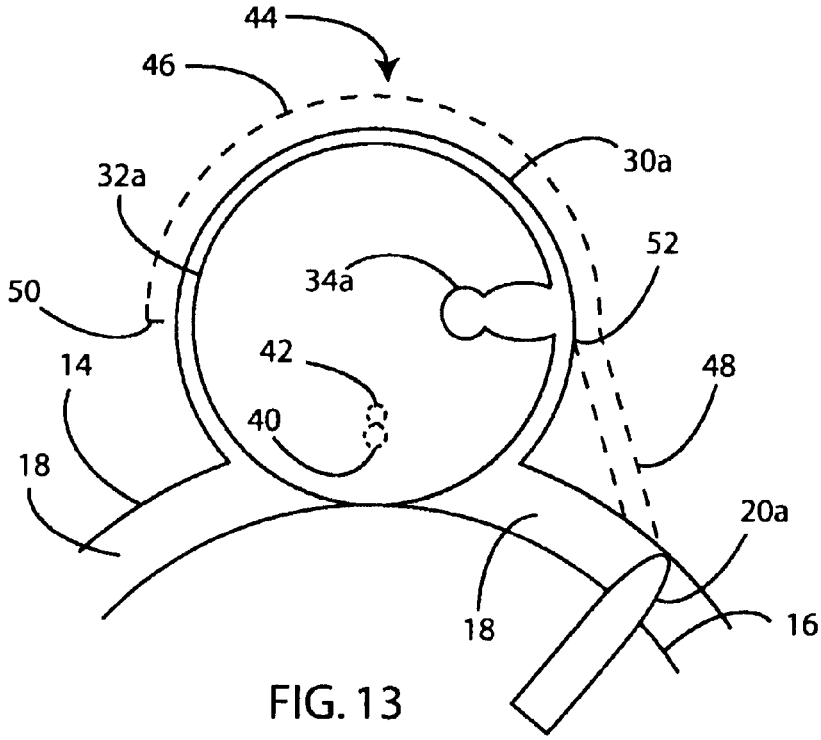
FIG. 13 is a detail view of a combustion valve showing the relative positions between a piston, a rotating combustion valve and a passage as combustion gases begin to be carried from the combustion valve to the annular chamber by the passage.

Expanding gases from the combustion of the fuel act against piston 20a, driving rotor 16 in a clockwise rotation. As combustion valve 32a rotates, piston 20a leaves recess 34a and the expanding combustion gases enter annular chamber 18 behind piston 20a, continuing to force piston 20a in a clockwise direction through annular chamber 18. As combustion valve 32a rotates further in a counterclockwise direction, the opening into recess 34a rotates from annular chamber 18 into combustion valve cavity 30a, momentarily closing off recess 34a, as depicted in FIG. 12. As shown in FIG. 13, recess 34a in rotating combustion valve 32a opens into passage 44 as piston 20a sweeps past the location on the wall surface of rotor cavity 14 where the enclosed portion 48 of passage 44 opens into annular chamber 18. As valve 32a rotates, and while recess 34a is adjacent to the open portion 47 of passage 44, combustion gases expanding from recess 34a are carried by passage 44 to annular chamber 18 as piston 20a passes the opening of passage 44 positioned on the wall surface of rotor cavity 14, thus ensuring that the expanding combustion gases are carried from recess 34a in combustion valve 32a to annular chamber 18 behind piston 32a. Without proper positioning of the at least one passage 44, combustion gases may otherwise be carried to a location ahead of advancing piston 20a, thereby reducing the efficiency of the engine.

The operation of rotary engine 10 continues in an identical manner, now with focus on piston 20b. As rotor 16 continues to rotate in a clockwise direction, piston 20b approaches combustion valve 32a. Piston 20b compresses the air in annular chamber 18 previously drawn in through intake port 36 by piston 20a while simultaneously drawing in fresh air through intake port 36 behind piston 20b. As piston 20b approaches combustion valve 32a, piston 20b is received into recess 34a, therefore allowing piston 20b to traverse valve 32a. As piston 20b rotates through valve 32a it approaches a top dead center position. The excess space between the portion of piston 20b received into recess 34a and combustion valve 32a encompassing and defining recess 34a again defines combustion chamber 70. Also, as valve 32a nears the top dead center position, recess 34a uncovers fuel injection port 40 and fuel is injected into recess 34a.

As with the ignition event involving piston 20a, during a period of time in which ignition port 42 is uncovered and piston 20b is received by recess 34a, the ignition device located in ignition port 42 ignites the fuel. Ignition timing may be controlled in a manner as previously described. Expanding gases from the combustion of the fuel act against piston 20b, driving rotor 16 in a clockwise rotation. As combustion valve 32a rotates in a counterclockwise direction, combustion gases expanding from recess 34a continue to expand into annular chamber 18 behind piston 20b through passage 44, driving piston 20b forward in a clockwise rotation through annular chamber 18. As piston 20b nears intake exhaust valve 32b, intake/exhaust valve 32b rotates to a position where recess 34b provides for increased flow through exhaust port 38, and piston 20b simultaneously forces the remaining combustion gases forward of piston 20b, which resulted from the previously described combustion event of piston 20a, out through exhaust port 38.

As can readily be appreciated, rotary engine 10 advantageously has two ignition, or combustion events (power strokes) during each 360 degree rotation of rotor 16, with each piston participating in a power stroke. That is, as each of the pistons passes through combustion valve 32a, a combustion event occurs. The combustion gases resulting from the combustion event are directed behind the piston, driving rotor 16 in a clockwise rotation until the combustion gases are discharged from the engine through exhaust port 38.

As will be apparent to those skilled in the art, rotary engine 10 may include additional pistons and valves. That is, pistons and valves may be doubled, the total number of valves being an even number, and the valves being equally divided between combustion valves and intake/exhaust valves, moving from a two-piston two-valve engine to a four-piston four-valve engine to an eight-piston eight-valve engine and so forth. Moreover, as intake/exhaust valves are added, a requisite number of intake ports and exhaust ports are also added, one intake port and one exhaust port for each intake/exhaust valve. In the direction of rotation of rotor 16, each combustion valve is followed by an intake/exhaust valve.

Figure 14:
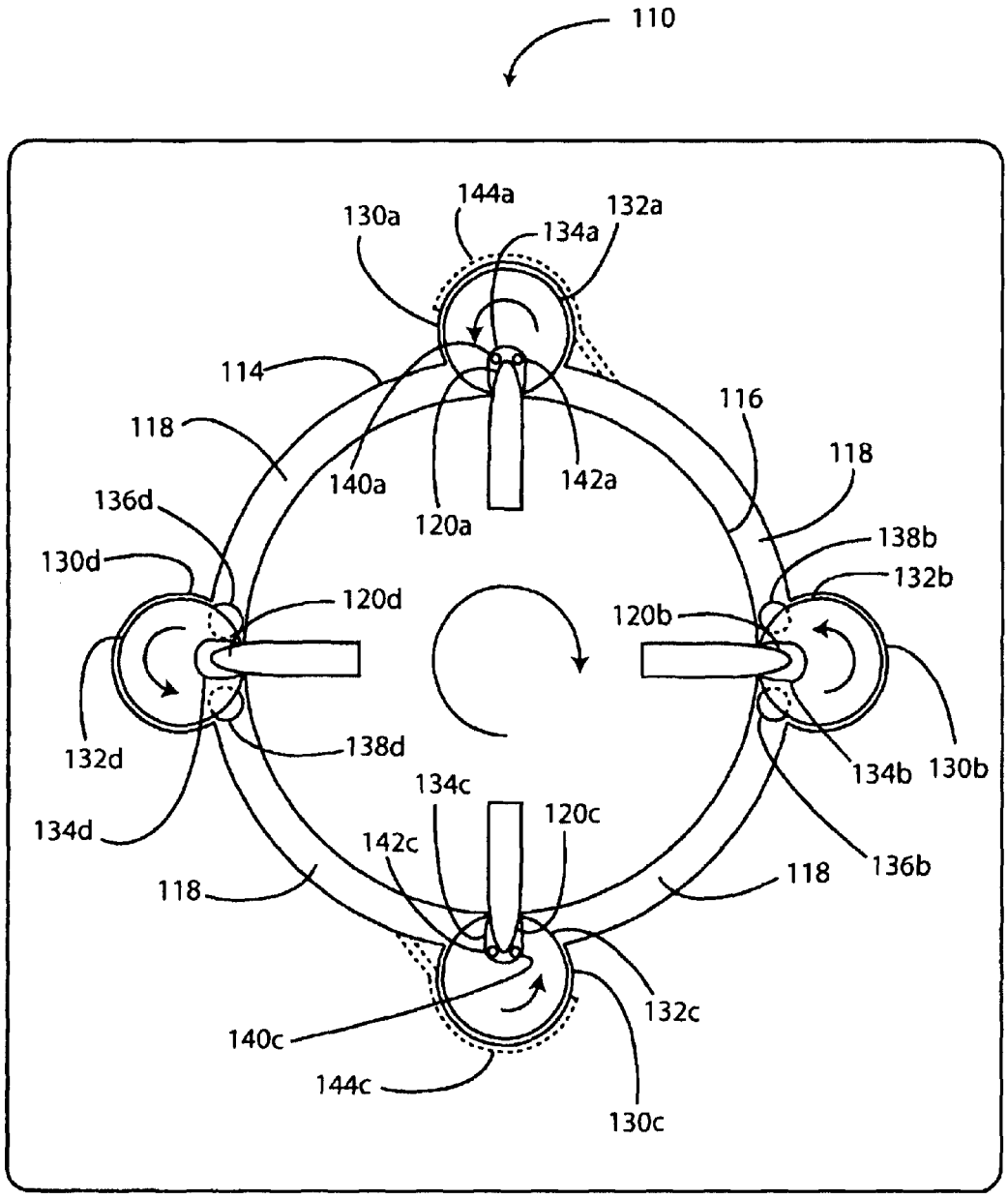
FIG. 14 is a view of a second embodiment of the rotary engine according to the present invention.

In a preferred embodiment of the invention, rotary engine 110, shown in FIG. 14, is similar to rotary engine 10 of the previous embodiment except that two pistons and two valves have been added, for a total of four pistons 120a, 120b, 120c and 120d, and four combustion valve cavities 130a, 130b, 130c, and 130d in which are mounted four valves; combustion valves 132a and 132c, and intake/exhaust valves 132b and 132d. Preferably, pistons 120a and 120b, 120c and 120d are slidably disposed in rotor 116. The four valves 132a, 132b, 132c, and 132d each include at least one recess 134a, 134b, 134c, and 134d, respectively, to allow passage of pistons 120a and 120b, 120c past valves 132a-132d during rotation of rotor 116. In the manner described for rotary engine 10, recesses 134a and 134c function as combustion chambers when receiving a piston. Also as in the previous embodiment, the diameter of the valves, and the number of recesses in each valve is dependent upon the number of pistons and the constraints that a) the surface speed of each valve matches the surface speed of the rotor and b) the number of valves is equal to the number of pistons. For the four-piston, four-valve engine of the present embodiment, for example, each valve may include two recesses, in which case each valve would have a diameter one half the diameter of rotor 116. On the other hand, for the case in which each valve is comprised of four recesses, each valve will have a diameter equal to the diameter of rotor 116. The number of valves or pistons, the diameter of the valves and the number of recesses in each valve can be related through the expression $$D=R/P \qquad [1]$$

where D is the diameter of the valves expressed as a fraction of the diameter of the rotor, R is the number of recesses in each valve and P is the number of pistons (or valves).

Rotary engine 110 further includes intake port 136b and exhaust port 138b, and intake port 136d and exhaust port 138d located near intake/exhaust valves 132b and 132d, respectively. Preferably, intake ports 136b and 136d, and exhaust ports 138b and 138d are partially overlapped by intake exhaust valves 132b and 132d, respectively, and valves 132b and 132d vary the flow of gases through each respective port.

Rotary engine 110 also includes at least two fuel injection ports 140a and 140c, at least two ignition ports 142a and 142c, and passages 144a and 144c extending along a portion of the circumference of the wall of combustion valve cavities 130a and 130c, respectively, and further extending through housing 112 and opening into annular chamber 118 through the cylindrical wall surface of rotor cavity 114 downstream of combustion valves 132a and 132c (relative to the direction of rotation of rotor 116), respectively. The location and function of the passages 144a and 144c in combustion valve cavities 130a and 130c follows the location and function of the at least one passage 44 of rotary engine 10 disclosed supra, with appropriate scaling.

Operation of rotary engine 110 is similar to the operation of rotary engine 10. As piston 120a rotates in a clockwise direction through annular chamber 118, piston 120a compresses air previously drawn into annular chamber 118 by piston 120d through intake port 136d. Simultaneously, piston 120a is drawing in fresh air behind it through intake port 136d. As piston 120a approaches combustion valve 132a, recess 134a is rotating into a position to receive piston 120a. Piston 120a compresses the air forward of piston 120a into recess 134a. At a point in time during which piston 120a is received into recess 134a (and forms a combustion chamber), fuel is injected into recess 134a through fuel injection port 140a. Also at a point in time during which piston 120a is received into recess 134a, an ignition device located in ignition port 142a, such as a spark plug, ignites the mixture of compressed air and fuel in recess 134a. Expanding combustion gases acting against the rearward face of piston 120a drives rotor 116 in a clockwise direction. As piston 120a sweeps through annular chamber 118, piston 120a forces combustion gases in front of piston 120a that resulted from the previous combustion event out through exhaust port 138b. In addition, expanding combustion gases from recess 134a in the presently described combustion event are directed through passage 144a located in combustion valve cavity 130a into annular chamber 118 behind piston 120a through openings in the wall surface of rotor cavity 114.

At the same time the previously described combustion event is occurring, a similar combustion event is occurring between piston 120c and combustion valve 132c. It will therefore be appreciated by those skilled in the art that two (2) combustion events (or power strokes) occur for each 90 degrees of rotation of rotor 116, for a total of eight (8) power strokes for each 360 degree rotation of rotor 116. The increased number of pistons and valves, and thus the number of combustion events which occur for each 360 degree rotation of rotor 116 provides for smoother operation of the engine and more consistent torque output.

It will also be apparent that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A rotary engine comprising a housing having a first and second intersecting cavity disposed therein, the first and second cavities including cylindrical wall surfaces;

a rotor rotatably mounted in the first cavity, the housing and the rotor defining an annular chamber disposed therebetween, the rotor including a piston extending from the rotor into the annular chamber;

a first valve rotatably mounted in the second cavity, the first valve having a circumference and recess sized to accommodate the piston during a rotation of the rotor; [and]

at least one passage comprising an open portion formed in the cylindrical wall surface of the second cavity and an enclosed portion enclosed by the housing along a length of the enclosed portion, the open portion including a leading end and a trailing end with respect to a direction of rotation of the first valve and which open portion extends for at least about 20 degrees around a circumference of the cylindrical wall surface of the second cavity, and wherein the enclosed portion connects the open portion to the annular chamber downstream of the second cavity relative to a direction of rotation of the rotor*; and*

*wherein a distance between the leading end of the open portion and the intersection of the first and second cavities located on an upstream side of the second cavity with respect to the direction of rotation of the first valve is greater than a width of the recess at the circumference of the first valve, and wherein a distance between the leading end of the open portion and the intersection of the first and second cavities located on an upstream side of the second cavity with respect to the direction of rotation of the first valve is greater than a width of the recess at the circumference of the first valve.*

2. The rotary engine according to claim 1 wherein the open portion extends for at least about 90 degrees around the circumference of the second cavity.

3. The rotary engine according to claim 1 wherein the open portion extends for at least about 180 degrees around the circumference of the second cavity.

[4. The rotary engine according to claim 1 wherein a distance between the trailing end of the open portion and the intersection of the first and second cavities located on a downstream side of the second cavity with respect to the direction of rotation of the first valve is greater than a width of the recess at the circumference of the first valve.]

[5. The rotary engine according to claim 4 wherein a distance between the leading end of the open portion and the intersection of the first and second cavities located on an upstream side of the second cavity with respect to the direction of rotation of the first valve is greater than a width of the recess at the circumference of the first valve.]

6. The rotary engine according to claim 1 further comprising:

a third cavity disposed in the housing and intersecting the first cavity;

a second valve rotatably mounted in the third cavity;

at least one intake port disposed within the annular chamber;

at least one exhaust port disposed within the annular chamber; and wherein a flow of gases through the intake port and the exhaust port is varied by the second valve.

7. The rotary engine according to claim 1 further comprising at least one fuel injection port [formed in the housing and positioned such that] *opening into the second cavity wherein* a [combustible] fuel is injected through the fuel injection port [directly] into the [at least one combustion chamber] *recess in the first valve.*

8. The rotary engine according to claim 7 further comprising at least one ignition port opening into the second cavity and adjacent to an end face of the first valve.

*9. The rotary engine according to claim 8 further comprising a plurality of ignition ports opening into the second cavity in an opposing relationship.*

*10. The rotary engine according to claim 1 wherein the at least one passage comprises a plurality of passages.*

*11. The rotary engine according to claim 1 further comprising a plurality of valves equally divided between combustion valves and intake/exhaust valves.*

* * * * *